(12) United States Patent
Neeff et al.

(10) Patent No.: US 12,017,431 B2
(45) Date of Patent: Jun. 25, 2024

(54) GLAZING COMPRISING A SWITCHABLE DEVICE, LAMINATED STRUCTURE AND METHOD FOR MANUFACTURING OF A GLAZING

(71) Applicant: Merck Patent GmbH, Darmstadt (DE)

(72) Inventors: Rainer Neeff, Neu-Isenburg (DE); Michael Junge, Pfungstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 366 days.

(21) Appl. No.: 17/414,406

(22) PCT Filed: Dec. 17, 2019

(86) PCT No.: PCT/EP2019/085477
§ 371 (c)(1),
(2) Date: Jun. 16, 2021

(87) PCT Pub. No.: WO2020/127138
PCT Pub. Date: Jun. 25, 2020

(65) Prior Publication Data
US 2022/0055351 A1   Feb. 24, 2022

(30) Foreign Application Priority Data
Dec. 18, 2018   (EP) ..................................... 18213356

(51) Int. Cl.
*B32B 17/10* (2006.01)
*B32B 7/12* (2006.01)
*G02F 1/1333* (2006.01)

(52) U.S. Cl.
CPC .......... *B32B 17/10504* (2013.01); *B32B 7/12* (2013.01); *B32B 17/10055* (2013.01);
(Continued)

(58) Field of Classification Search
CPC ................ B32B 17/10504; B32B 7/12; B32B 17/10055; G02F 1/133302
See application file for complete search history.

(56) References Cited

U.S. PATENT DOCUMENTS

| | | | |
|---|---|---|---|
| 5,859,681 A * | 1/1999 | VanderPloeg | G02F 1/133634 349/120 |
| 6,034,752 A * | 3/2000 | Khan | G02F 1/13718 349/169 |

(Continued)

FOREIGN PATENT DOCUMENTS

| | | |
|---|---|---|
| DE | 102017203627 A1 | 9/2018 |
| EP | 2128688 A1 | 12/2009 |

(Continued)

OTHER PUBLICATIONS

R. Baetens et al., „Properties, requirements and possibilities of smart windows for dynamic daylight and solar energy control in buildings: A state-of-the-art review, Solar Energy Materials & Solar Cells, 94 (2010), pp. 87-105.

(Continued)

*Primary Examiner* — Lucy P Chien
(74) *Attorney, Agent, or Firm* — Millen, White, Zelano & Branigan, P.C.; Brion P. Heaney

(57) ABSTRACT

A glazing (10) comprising a switchable optical device (26) is proposed. The switchable optical device (26) has a layer structure comprising in this order a first substrate (12), a switchable layer (18) and a second substrate (24). Further, at least one of the first substrate (12) and the second substrate (24) is attached to a further sheet (30) by means of an adhesive tape (40) or an optically clear adhesive (48).
Further aspects of the invention relate to a laminated structure and an insulated glazing unit comprising such a glazing (10) and a method for manufacturing of such a glazing (10).

14 Claims, 3 Drawing Sheets

(52) U.S. Cl.
CPC .... *B32B 17/1011* (2013.01); *B32B 17/10137* (2013.01); *B32B 17/10201* (2013.01); *B32B 17/10743* (2013.01); *B32B 17/10761* (2013.01); *B32B 17/10798* (2013.01); *B32B 17/10862* (2013.01); *G02F 1/133302* (2021.01); *B32B 2255/26* (2013.01); *B32B 2307/202* (2013.01); *B32B 2307/304* (2013.01); *B32B 2307/412* (2013.01); *B32B 2307/732* (2013.01); *B32B 2315/08* (2013.01); *B32B 2419/00* (2013.01); *B32B 2605/006* (2013.01); *G02F 2202/28* (2013.01)

(56) References Cited

U.S. PATENT DOCUMENTS

| | | | |
|---|---|---|---|
| 10,197,882 | B2 | 2/2019 | Bertolini |
| 10,603,988 | B2 | 3/2020 | Ponal |
| 2003/0011737 | A1* | 1/2003 | Matsuoka ............. G02F 1/1339 349/153 |
| 2005/0002081 | A1 | 1/2005 | Beteille et al. |
| 2008/0220184 | A1* | 9/2008 | Sakurai ............. G02F 1/133308 428/1.51 |
| 2015/0036204 | A1* | 2/2015 | Branda ................. G02B 26/02 359/244 |
| 2020/0230920 | A1 | 7/2020 | Keller et al. |
| 2020/0299180 | A1* | 9/2020 | Hirose .................... C03C 3/091 |

FOREIGN PATENT DOCUMENTS

| | | |
|---|---|---|
| EP | 2965903 B1 | 9/2018 |
| EP | 3350001 B1 | 6/2019 |
| WO | 15117736 A1 | 8/2015 |
| WO | 15158364 A1 | 10/2015 |

OTHER PUBLICATIONS

Henkel, Technical Data Sheet LOCTITE DSP 3195, 2014 (pp. 1-3).
International Search report PCT/EP2019/085477 dated Feb. 26, 2020 (pp. 1-4).

* cited by examiner

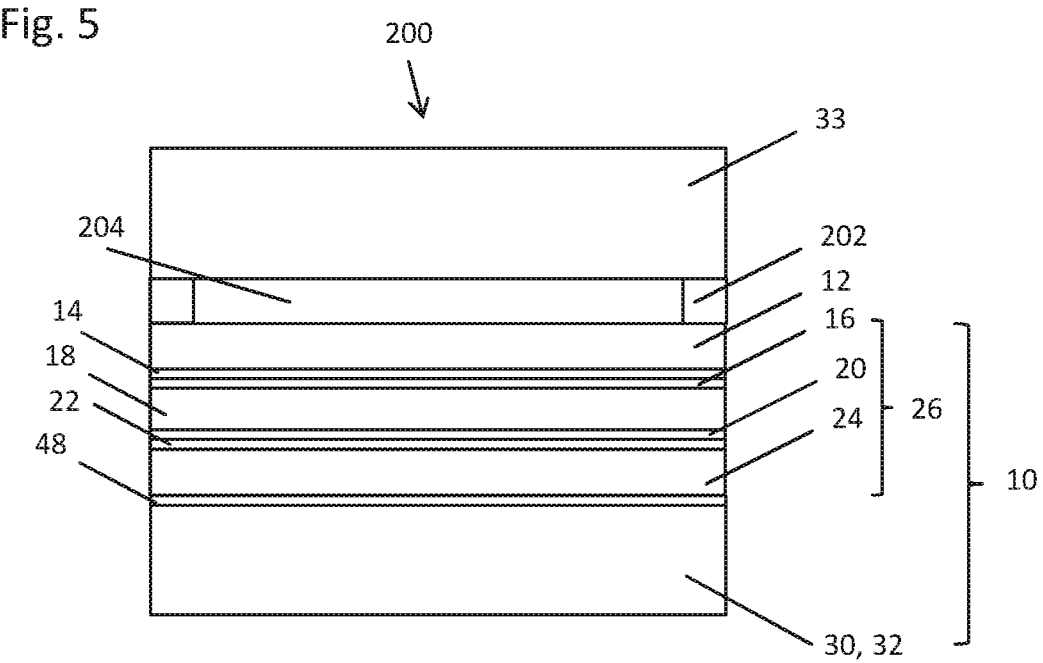

GLAZING COMPRISING A SWITCHABLE DEVICE, LAMINATED STRUCTURE AND METHOD FOR MANUFACTURING OF A GLAZING

The invention relates to a glazing comprising a switchable optical device having a layer structure comprising in this order a first substrate, a switchable layer and a second substrate. Further aspects of the invention relate to a laminated structure and an insulated glazing unit comprising such a glazing and to a method for manufacturing of such a glazing.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal-based devices employ a change in the orientation of liquid crystal molecules between two conductive electrodes by applying an electric field which results in a change of their transmittance.

Liquid crystal-based devices usually comprise in this order a first substrate layer, a switchable layer and a second substrate layer. The switchable layer comprises at least one liquid crystalline material. The two substrates are coated with a transparent electrode to allow control of the switchable layer by means of an electric field.

In smart windows, the device for modulating the transmittance of light, in the following referred to as switchable optical device, is usually laminated to a carrier glass sheet for protection of the switchable optical device and for mechanical rigidity. In this lamination process, a glass sheet is bonded to a substrate of the switchable optical device by means of a thermoplastic interlayer. In the lamination process, the interlayer is arranged between the carrier glass sheet and the at least one switchable optical device. In a subsequent treatment, which usually involves application of heat and/or elevated pressure, the at least one sheet, the interlayer and the switchable optical element are bonded.

Document WO 2015/158364 A1 describes laminated glass for separating a vehicle interior from the external surroundings. The laminated glass comprises an inner pane made of glass having a thickness of 0.1 mm to 0.4 mm, an outer pane of glass having a thickness of 1.0 to 1.8 mm and a thermoplastic intermediate layer which connects the inner pane to the outer pane.

Document DE 10 2017 203 627 A1 discloses an adaptive laminated panel element comprising a first panel element, a first connecting layer, a liquid crystal layer, a second connecting layer and a second panel element. The first and second panel elements are laminated to the liquid crystal layer by means of lamination. Preferably, PVB or EVA sheets are used as connecting layers.

EP 2 965 903 A1 discloses a switchable window, in particular for use in an aircraft, helicopter or space vehicle. The window comprises an outer pane construction and an inner pane construction having an electrically switchable film. The inner pane construction may be realized as a suspended particle device (SPD) electrochromic laminated panel. Such a laminated panel comprises an inner sheet, an electrically switchable film and an outer sheet. The inner and outer sheets are preferably made of polycarbonate (PC), PMMA or glass and are laminated to the switchable film by means of an interlayer. The material of the interlayer may be polyurethane (PU), polyvinylbutyral (PVB), or ethylenevinylacetate (EVA) in the form of a foil.

The use of thin substrates is desirable to allow for reduced thickness of the functional glazing stack which allows for higher design flexibility.

It is an object of the invention to provide a glazing which may be produced in a simple process having a high yield.

A glazing comprising a switchable optical device is proposed. The switchable optical device has a layer structure comprising in this order a first substrate, a switchable layer and a second substrate. Further, at least one of the first substrate and the second substrate is attached to a further sheet by means of an adhesive tape or an optically clear adhesive.

It was presently recognized that lamination typically is difficult for thin glass and thus yield can be low. It is even more difficult when (thin) functional switchable optical devices such as liquid crystal cells are used in the lamination process. Mechanical stress can be high due to process conditions which usually involve pressure of up to 12 bar and temperatures around 120° C. to 140° C. The time span in which the elevated temperature and pressure is applied can also be an issue. Usually, the elevated temperature and pressure are applied for about 20 minutes.

The switchable layer is preferably a liquid crystalline based layer which preferably comprises at least one of a dye doped liquid crystal layer, a polymer stabilized chiral liquid crystal layer and a polymer dispersed liquid crystal layer.

Preferably, the state of the switchable layer is controlled using an electric field which is applied by means of two electrodes. The electrodes are preferably transparent electrodes which are arranged on the first and second substrate layer in form of a coating. Usually, the coating is applied to the side of the substrate layer which is facing the switching layer.

The switchable layer comprises a liquid crystalline medium. The state of the liquid crystalline medium is controlled by an electric field which is applied by means of the two electrodes. Preferably, the liquid crystal-based element additionally comprises an alignment layer located on the first substrate and/or the second substrate. The alignment layer is preferably arranged on the side facing the switchable layer. If an electrode is also located on the respective substrate, the alignment layer is preferably arranged on the electrode so that the alignment layer is in direct contact with the switchable layer. The alignment film may, for example, be a polyimide layer being rubbed in an alignment direction.

Preferably, the layer structure of the switchable optical device comprises in this order the first substrate, a first electrode layer, a first alignment layer, the switchable layer, a second alignment layer, a second electrode layer and the second substrate.

The switchable optical device has at least two switching states. The switching states may, for example, include a clear and transparent state, a dark state, a hazy state and mixtures of at least two of these states.

The two substrates and the liquid-crystalline medium of the switchable layer are arranged as a cell wherein the liquid-crystalline medium is placed in the gap formed by the two substrates. The size of the gap is preferably from 1 μm to 300 μm, preferably from 3 μm to 100 μm and more preferably from 5 μm to 100 μm, and most preferably from 10 μm to 50 μm. The cell is usually sealed by means of glue lines located at or near the edges.

To maintain a proper thickness of the switching layer, spacers may be included within the cell gap of the switching layer. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. In some embodiments it can be especially beneficial to use spacers which are black and sticky. Alternatively, the cell thickness may be set or maintained by other suitable means, e.g. by using column spacers. The column spacers may also be formed to give compartments.

The switchable layer of the switchable optical device comprises a liquid-crystalline medium. A liquid-crystalline medium is defined as a material having the properties of a liquid crystal. Typical liquid-crystalline media comprise at least one composition having elongated rod-shaped molecules. The liquid-crystalline media used in conjunction with the present invention have at least two states in the cell. The state of the liquid-crystalline medium is controlled using an electric field which is generated by an AC driving voltage applied between the two electrodes.

The first and/or second substrate of the switchable optical device is preferably optically transparent. The term optically transparent means that the material is transparent for light in the visual spectral range (about 380 nm to 780 nm) and that the material is essentially free of haze. The term optically clear is used in the art to refer to adhesives which are transparent for light in the visual spectral range and essentially do not alter the visual appearance so that they are essentially free of haze.

Preferably, the thickness of the first substrate and/or of the second substrate is in the range of from 0.05 mm to 1.1 mm. More preferably, the thickness is in the range from 0.5 mm to 0.7 mm. It is preferred that both the first substrate and the second substrate have a thickness in said preferred or more preferred range.

Preferably, the first substrate and/or the second substrate is an alkali-free glass or a chemically strengthened glass.

Suitable alkali-free glass includes boro-silicate glass or alumino-silicate glass, which has low alkali content or even no alkali content in the glass recipe. Such glass is, for example, available under the tradename Eagle 2000 glass or EAGLE XG slim glass from Corning and under the tradename AF32 or BOROFLOAT from Schott.

Suitable chemically strengthened glass is, for example, available under the tradename Gorilla from Corning and under the tradename Dragontrail from Asahi Glass Corporation (AGC).

Preferably, the further sheet is a substrate of a further switchable optical device.

Additionally or alternatively, the further sheet is an optically transparent glass sheet or an optically transparent polymer sheet. The further glass sheet may, for example, be used in order to provide further mechanical strength to the glazing.

Preferably, the thickness of the further sheet is in the range of from 2 mm to 10 mm, wherein a range of from 2 to 6 mm is more preferred.

Suitable materials for the further sheet include the materials which are suitable as one of the substrates. In addition other glass, e.g. soda-lime glass, or polymer materials, which are preferably optically transparent, may be used.

Suitable glass materials for the further sheet include, for example, float glass or downdraw glass. The glass may also have been subjected to a pre-processing step like tempering, toughening and/or coating or sputtering. The glass can be, for example, soda-lime glass, borosilicate glass or aluminosilicate glass.

Suitable polymers include, for example, polymethyl methacrylate (PMMA), polycarbonate (PC), polyethylene terephthalate (PET) and cellulose triacetate (TAO).

The switchable optical device is attached to the further sheet by means of an optically clear adhesive or an adhesive tape. If an adhesive tape is used, the adhesive tape may be configured as a single layer of optically clear adhesive material. Alternatively, the adhesive tape is configured as a double coated adhesive tape comprising a first adhesive layer, a carrier layer and a second adhesive layer. All layers of the adhesive tape are preferably optically clear.

A suitable double coated adhesive tape is available from Nitto Denko under the designation No. 5610 and No. 5610BN. These adhesive tapes are 0.10 mm-thick double-coated adhesive tapes consisting of a polyester film base coated with acrylic adhesive.

Preferably, the switchable optical device and/or the further switchable optical device is a liquid crystal device selected from a dye-doped twisted nematic, super twisted nematic, vertically aligned or polymer stabilized cholesteric texture device. The device may include further functional layers such as, for example, color filters and/or polarizers.

An example of an optical switching device comprising a polarization layer and a switching layer is disclosed in EP 3 260 913 A1. The switching layer comprises a liquid-crystalline material and a dichroic dye compound. The switching layer comprises a bright state and a dark state.

In a device having vertically aligned liquid crystal layer, the liquid crystal molecules are orientated such that the director is perpendicular to the plane of the layer structure. Thus, the pretilt angle of the liquid crystal layer is about 90°. The pretilt angle may be influenced by means of the alignment layer. A pretilt angle of about 90° may be achieved, for example, by incorporating polyhedral oligomeric silsesquioxane (POSS) nanoparticles in a polyimide alignment layer. This and further methods for controlling the pretilt angle are, for example, described in the publication "Controlling the Alignment of Polyimide for Liquid Crystal Devices", Shie-Chang Jeng and Shug-June Hwang, Dec. 19, 2012, DOI 10.5772/53457. Preferably, polymer stabilized vertical alignment (PS-VA) may be used.

In contrast to the use of one of said adhesives, lamination involves the use of a thermoplastic or elastomeric interlayer and requires the application of heat and pressure over a timespan of usually about 20 minutes.

For lamination, an interlayer is arranged between the two elements to be joined and in a subsequent treatment, which involves application of heat and/or elevated pressure, the two elements and the interlayer are bonded. The interlayers such as, for example, an ionoplast, ethylene vinyl acetate (EVA), polyvinyl butyral (PVB) or thermoplastic polyurethane (TPU) do not have adhesive properties when they are applied without pressure and heat.

In conjunction with switchable optical devices it is desirable to avoid elevated temperatures as processing of the device at high temperatures may damage the device and thus reduce yield.

In contrast to lamination, the adhesive layers of the adhesive tape are sticky and have adhesive properties at room temperature (about 15° C. to 30° C.) and without application of elevated pressure. Further, the optically clear adhesive is, in contrast to lamination, provided in the form of an adhesive tape or a liquid and does not require the application of heat and pressure for bonding. However, applying some gentle heating or gentle pressure may in some cases further enhance or accelerate adhesion.

Preferably, the optically clear adhesive and/or the adhesive of the adhesive tape is selected from an acrylic adhesive or a silicone adhesive.

Preferably, the optically clear adhesive is provided as a liquid which is first applied to a substrate and/or the further sheet. In a subsequent step, the two parts are bonded together and the liquid optically clear adhesive is cured, for example by means of UV radiation. Further, the bonded substrate and further sheet may be pressed, for example by means of a roller, in order to remove any residual air.

Suitable liquid clear optical adhesives are acrylate-based adhesives or silicone-based adhesives. A suitable acrylate-based adhesive is, for example available under the tradename Loctite 3195 from Henkel. A suitable silicone-based adhesive is, for example, available under the tradename Loctite 5192DM from Henkel.

Suitable optically clear adhesive tapes are, for example acrylic tapes. Suitable optically clear adhesive tapes are, for example, available under the tradename 5417SA from Sekisui Chemical GmbH and under the tradename tesa 69401 from Tesa SE.

Preferably, an index of refraction and/or a coefficient of thermal expansion of the optically clear adhesive or of the adhesive tape is selected to correspond or match to the respective property of the first substrate or second substrate.

Preferably, the index of refraction and/or the coefficient of thermal expansion are considered to correspond or match the respective property of a substrate if the difference is less than 20%, more preferably less than 10% and most preferred less than 5%. Preferably the parameters are matched for the operating temperature of the glazing. The operating temperature of the glazing is preferably in the range of from −20° C. to 70° C.

The use of the optically clear adhesive or of the adhesive tape may advantageously lead to a favourable or improved transmittance of visible light, e.g. for light having a wavelength of 400 nm, in particular when compared to the use of lamination materials such as PVB. This means that the overall optical contrast or the transmission swing obtainable from switching between the switching states of the optical device and the glazing can be favourably increased.

Preferably, the layer structure of the glazing is symmetric around the switchable layer. In another embodiment the layer structure of the glazing is substantially symmetric around the switchable layer.

In such a symmetric configuration, which comprises for example a switchable optical device which is embedded between a first glass sheet and a second glass sheet, mechanical stress which could lead to bowing of the structure is minimized.

In a further aspect of the invention, a laminated structure comprising one of the glazings is provided. In the proposed laminated structure, the glazing is laminated to a glass sheet or a further switchable optical device by means of an interlayer.

For lamination, an interlayer is arranged between the first or second substrate and the glass sheet. In a subsequent treatment, which involves application of heat and elevated pressure, the respective substrate, the interlayer and the glass sheet are bonded.

Suitable lamination sheets include, for example, an ionoplast, ethylene vinyl acetate (EVA), polyvinyl butyral (PVB) or thermoplastic polyurethane (TPU).

A suitable ionoplast is available under the trade name SentryGlas.

In a preferred embodiment lamination sheets, in particular a PVB layer, which are facing the outermost pane towards the exterior additionally provide UV protection.

In a further aspect of the invention an insulated glazing unit comprising at least one of the described glazings and/or at least one of the described laminated structures is provided.

The insulated glazing unit further comprises a spacer which defines a cavity for thermal insulation. Additionally, the insulated glazing unit may comprise an additional glass sheet. Further, a frame may be provided which holds the glazing, the spacer and the additional glass sheet.

The glazing, the laminated structure and/or the insulated glazing unit may preferably be used as a window of a building or a vehicle.

The glazing, the laminated structure and/or the insulated glazing may generally also be used as a light valve or shutter, in particular a switchable blind or screen or respectively as a switchable sun shield, in a car, a bus, a recreational vehicle, a commercial vehicle, a boat, a train or an airplane.

The glazing and in particular the insulated glazing may preferably be arranged as a double glazing unit or as a triple glazing unit.

It is a further aspect of the invention to provide a method for manufacturing of the described glazing. The method comprises the steps of a) providing a switchable optical device, at least one further sheet and an adhesive, wherein the switchable optical device has a layer structure comprising in this order a first substrate, a switchable layer and a second substrate, and b) attaching the at least one further sheet to the first substrate by applying the adhesive to the first substrate and/or the at least one further sheet and pressing the at least one further sheet against the first substrate and/or attaching the at least one further sheet to the second substrate by applying the adhesive to the second substrate and/or the at least one further sheet and pressing the at least one further sheet against the second substrate.

Preferably, the adhesive is provided in form a liquid optically clear adhesive, in the form of double coated adhesive tape or in the form of an adhesive film.

Preferably, the adhesive is provided in form of a liquid adhesive which is cured during and/or after pressing. Curing may be performed, for example, by means of electromagnetic radiation and/or heat. In particular, the use of ultraviolet (UV) light is preferred. The UV light may be applied by means of, for example, UV LEDs or by a mercury vapor lamp.

The liquid adhesive may be applied to both elements to be bonded, for example to both the first or second substrate and the further sheet, or only to a single one of said elements. The liquid adhesive may be applied by means of a dispenser. After application of the liquid adhesive, the two elements or bonded and then pressed.

Preferably, pressing is performed by means of a roller. The pressing step is preferably used for removing any trapped air from the adhesive in order to provide a bubble-free bond.

The inventive method allows the production of a glazing comprising a switchable optical device while avoiding lamination processes which involve elevated temperatures. Exposure of the switchable optical device to high temperatures and also elevated pressure and thus potential damage of the device is avoided and thus a high yield is obtained.

The attaching according to step b) is preferably performed at room temperature (about 15° C. to 30° C.). The use of an adhesive avoids the application of elevated temperatures which are required in usual lamination processes and which may damage the switchable optical device.

BRIEF DESCRIPTION OF THE DRAWINGS

The drawings show:

FIG. 5 an insulated glazing unit comprising a glazing.

In FIG. 1 a first embodiment of a glazing 10 is shown. The inventive glazing 10 has a layer structure which comprises a switchable optical device 26 which comprises in this order a first substrate 12, a first electrode layer 14, a first alignment layer 16, a switchable layer 18, a second alignment layer 20, a second electrode layer 22 and a second substrate 24. The two substrates 12, 24 are arranged such that a liquid crystal cell having a cell gap is formed. The switchable layer 18 is sandwiched between the two substrates 12, 24, wherein the two alignment layers 16, 20 are facing towards the switchable layer 18. The switchable layer 18 includes a liquid crystalline medium.

Figure 1:
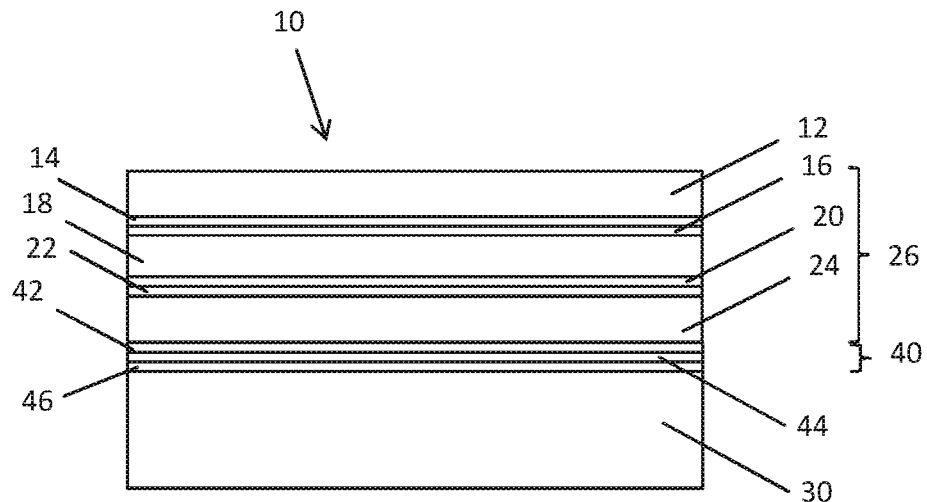
FIG. 1 a first embodiment of a glazing having a switchable layer.

The first substrate 12 and the second substrate 24 are both optically transparent. The material of the first substrate 12 and of the second substrate 24 may be selected independently. Preferably, the material of the first substrate 12 and second substrate 24 is an alkali-free glass, borofloat glass or a chemically strengthened glass.

The glazing 10 of the first embodiment additionally comprises a further sheet 30 which is attached to the second substrate 24 of the switchable optical device 26 by means of an adhesive tape 40. The adhesive tape 40 has a layer structure which comprises in this order a first adhesive layer 42, a carrier layer 44 and a second adhesive layer 46. All layers of the adhesive tape 40 are transparent. The further sheet 30 is also optically transparent. Suitable materials for the further sheet 30 include alkali-free glass, borofloat glass and a chemically strengthened glass.

Figure 2:
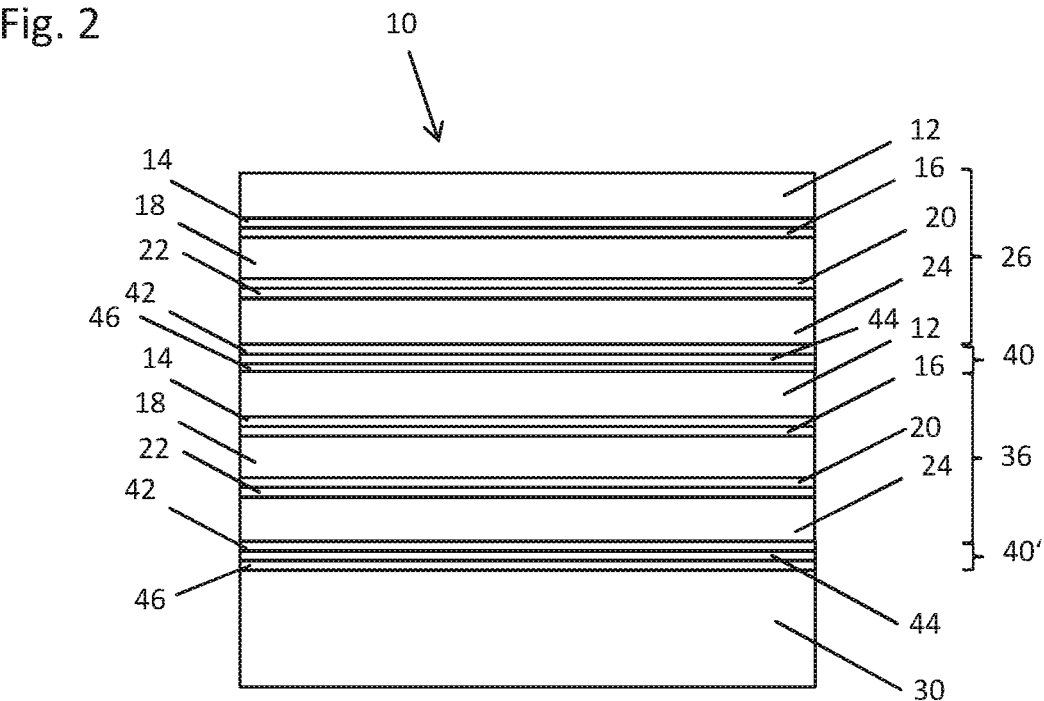
FIG. 2 a second embodiment of a glazing having two switchable layers.

FIG. 2 shows a second embodiment of the glazing 10. The glazing 10 of FIG. 2 comprises in this order the switchable optical device 26, the adhesive tape 40, a further switchable optical device 36, a further adhesive tape 40' and the further sheet 30. The two switchable optical devices 26, 36 and the further sheet 30 are attached to each other by means of the adhesive tape 40 and the further adhesive tape 40'. The further adhesive tape 40' has the same configuration as the adhesive tape 40 which has been described with respect to the first embodiment of FIG. 1.

The switchable optical device 26 has the same layer structure as described with respect to the first embodiment of FIG. 1. In the embodiment shown in FIG. 2, the further switchable optical device 36 has an identical configuration and comprises in this order a first substrate 12, a first electrode layer 14, a first alignment layer 16, a switchable layer 18, a second alignment layer 20, a second electrode layer 22 and a second substrate 24.

Figure 3:
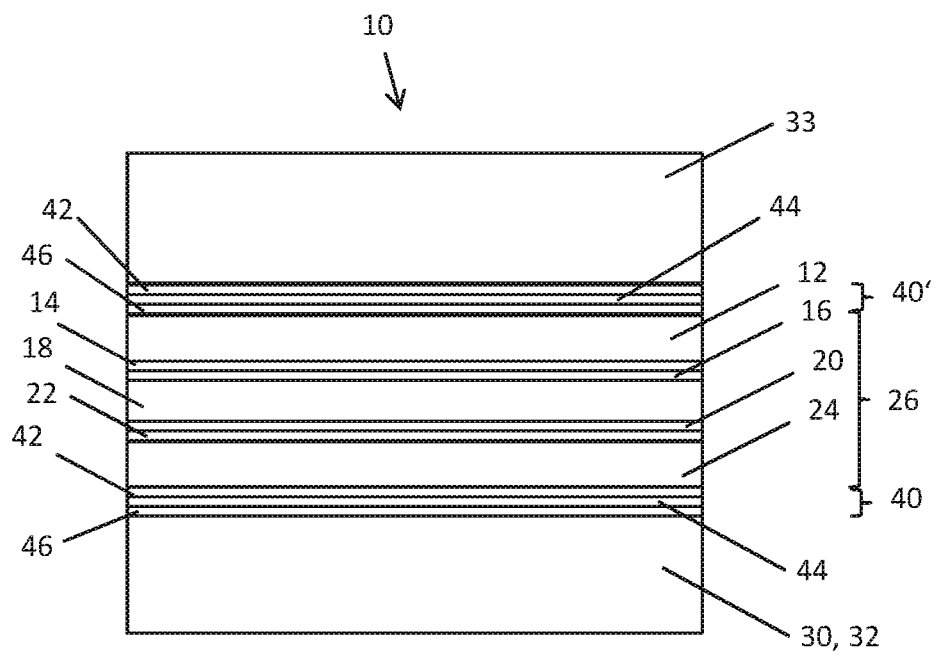
FIG. 3 a third embodiment of a glazing.

FIG. 3 shows a third embodiment of the glazing 10. The third embodiment of the glazing 10 has all layers of the first embodiment of FIG. 1. In addition, the glazing 10 of the third embodiment comprises a second glass sheet 33, which is attached to the first substrate 12 by means of a further adhesive tape 40'. Thus, the glazing 10 shown in FIG. 3 has a symmetric configuration around the switchable layer 20 of the switchable optical device 26. The symmetric structure comprises in this order the further sheet 30, which is used as a first glass sheet 32, the adhesive tape 40, the switchable optical device 26, the further adhesive tape 40' and the second glass sheet 33.

Figure 4:
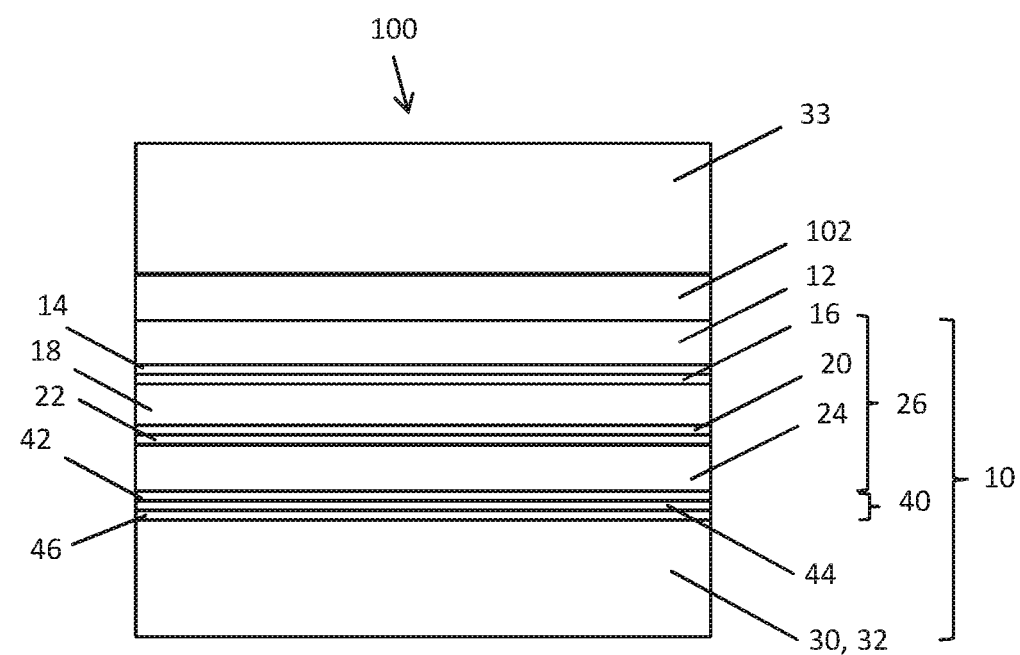
FIG. 4 a laminated structure comprising a glazing.

FIG. 4 shows a laminated structure 100 comprising a second glass sheet 33, an interlayer 102 and the glazing 10 of the first embodiment as described with respect to FIG. 1. In the laminated structure 100 the switchable optical device 26 is embedded between two glass sheets 32, 33, wherein the further sheet 30 of the glazing 10 is used as a first glass sheet 32.

Advantageously, the first glass sheet 32 is attached to the switchable optical device 26 by means of the adhesive tape 40, so that only the second glass sheet 33 is laminated to the switchable optical device 26 in a process which involves elevated pressure and temperature.

FIG. 5 shows an insulated glazing unit 200 comprising a fourth embodiment of the glazing 10.

The glazing 10 of the fourth embodiment has a layer structure similar to the first embodiment and comprises the switchable optical device 26, which comprises in this order the first substrate 12, the first electrode layer 14, the first alignment layer 16, the switchable layer 18, the second alignment layer 20, the second electrode layer 22 and the second substrate 24. The two substrates 12, 24 are arranged such that a liquid crystal cell having a cell gap is formed. The switchable layer 18 is sandwiched between the two substrates 12, 24, wherein the two alignment layers 16, 20 are facing towards the switchable layer 18. The switchable layer 18 includes a liquid crystalline medium.

The layer structure of the glazing 10 of the fourth embodiment further comprises a first glass sheet 32 as further sheet 30, which is attached to the second substrate 24 by means of an optically clear adhesive 48. The optically clear adhesive 48 is preferably provided in the form of a liquid which is then cured, for example by application of UV radiation.

The glazing 10 of the fourth embodiment is part of the insulated glazing unit 200 which further comprises a spacer 202 and a second glass sheet 33. The spacer 202 defines cavity 204 which improves thermal insulation of the insulated glazing unit 200.

EXAMPLES

Example 1

Examples for laminated structures comprising a glazing having a switchable optical device are given below. The included switchable optical device may be configured as liquid crystal cell having planar alignment or as a liquid crystal cell having vertical alignment. The layers are listed from outside to inside:

2 mm-3.8 mm Schott Borofloat glass or >= 3 mm toughened SLG
0.38 or 0.76 mm PVB UV Protect or similar product with UV cut at 400 nm

```
0.5 to 0.7 mm EAGLE XG slim glass or chemically strengthened glass
~25 nm conductive coating (ITO) optionally with SiOx top coat
~50 to 100 nm polyimide alignment layer (for planar or vertical alignment)
5 to 15 µm (for planar) or 15 to 30 µm (for vertical alignment) liquid crystal
layer
~50 to 100 nm polyimide alignment layer (for planar or vertical alignment)
~25 nm conductive coating (ITO) optionally with SiOx topcoat
0.5 to 0.7 mm EAGLE XG slim glass or chemically strengthened glass
Optically clear adhesive (OCA) or adhesive tape
0.5 to 0.7 mm EAGLE XG slim glass or chemically strengthened glass
~25 nm conductive coating (ITO) optionally with SiOx topcoat
~50 to 100 nm polyimide alignment layer (for planar or vertical alignment)
5 to 15 µm (for planar) or 15 to 30 µm (for vertical alignment) liquid crystal
layer
~50 to 100 nm polyimide alignment layer (for planar or vertical alignment)
~25 nm conductive coating (ITO) optionally with SiOx topcoat
0.5 to 0.7 mm EAGLE XG slim glass or chemically strengthened glass
16 mm Argon filled cavity/IGU Spacer
3.8 mm Borofloat or >= 3 mm toughened SLG (soda lime glass)
with LowE coating
```

Example 2

Further examples for laminated structures comprising a glazing having a switchable optical device are given below. The included switchable optical device may be configured as liquid crystal cell having planar alignment or as a liquid crystal cell having vertical alignment. The layers are listed from outside to inside:

```
0.5 to 0.7 mm EAGLE XG slim glass or chemically strengthened glass
0.38 or 0.76 mm PVB UV Protect or similar product with UV cut at 400 nm
0.5 to 0.7 mm EAGLE XG slim glass or chemically strengthened glass
~25 nm conductive coating (ITO) optionally with SiOx topcoat
~50 to 100 nm polyimide alignment layer (for planar or vertical alignment)
5 to 15 µm (for planar) or 15 to 30 µm (for vertical alignment) liquid crystal
layer
~50 to 100 nm polyimide alignment layer (for planar or vertical alignment)
~25 nm conductive coating (ITO) optionally with SiOx topcoat
0.5 to 0.7 mm EAGLE XG slim glass or chemically strengthened glass
Optically clear adhesive (OCA) or adhesive tape
0.5 to 0.7 mm EAGLE XG slim glass or chemically strengthened glass
~25 nm conductive coating (ITO) optionally with SiOx topcoat
~50 to 100 nm polyimide alignment layer (for planar or vertical alignment)
5 to 15 µm (for planar) or 15 to 30 µm (for vertical alignment) liquid crystal
layer
~50 to 100 nm polyimide alignment layer (for planar or vertical alignment)
~25 nm conductive coating (ITO) optionally with SiOx topcoat
0.5 to 0.7 mm EAGLE XG slim glass or chemically strengthened glass
```

The laminated structure of Example 2 may, for example, be used in an airplane glazing unit. In such a unit, the laminated structure is placed between an outer window, which usually is a double glazing attached to the aircraft hull and an inner window, which may be a plastic pane.

The inner plastic pane in an air-plane glazing unit may even be omitted in particular when scratch-resistant and toughened or strengthened glass is used as the innermost layer of the glazing or respectively laminate structure, which can favourably lead to further weight reduction.

LIST OF REFERENCE NUMERALS 10 glazing
12 first substrate
14 first electrode layer
16 first alignment layer
18 switchable layer
20 second alignment layer
22 second electrode layer
24 second substrate
26 switchable optical device
30 further sheet
32 first glass sheet
33 second glass sheet
36 further switchable optical device
40 adhesive tape
40' further adhesive tape
42 first adhesive layer
44 carrier layer
46 second adhesive layer
48 optically clear adhesive
100 laminated structure
102 interlayer
200 insulated glazing unit
202 spacer
204 cavity

The invention claimed is:

1. Glazing (10) comprising a switchable optical device (26) having a layer structure comprising in this order a first substrate (12), a switchable layer (18) and a second substrate (24), wherein at least one of the first substrate (12) and the second substrate (24) is attached to a further sheet (30) by means of an adhesive tape (40) or an optically clear adhesive (48), wherein the thickness of the first substrate (12) and/or of the second substrate (24) is in the range of from 0.05 mm to 1.1 mm, wherein the glazing (10) is laminated to a glass sheet or a further switchable optical device (36) by means of an interlayer (102), wherein the thickness of the first substrate (12) and of the second substrate (24) is in the range of from 0.05 mm to 1.1 mm, wherein the first substrate (12) and/or the second substrate (24) is an alkali-free glass or a chemically strengthened glass, wherein the further sheet (30) is an optically transparent glass sheet, wherein the thickness of the further sheet (30) is in the range of from 2 mm to 10 mm, wherein the interlayer for lamination is a thermoplastic interlayer and wherein the laminated structure is a window of a building or a vehicle.

2. Glazing (10) according to claim 1, wherein the further sheet (30) is a substrate of a further switchable optical device (36).

3. Glazing according to claim 1, wherein the adhesive tape (40) is a double coated adhesive tape comprising a first adhesive layer (42), a carrier layer (44) and a second adhesive layer (46).

4. Glazing (10) according to claim 1, wherein an index of refraction and/or a coefficient of thermal expansion of the optically clear adhesive (48) or of the adhesive tape (40) is selected to correspond to the respective property of the first substrate (12) or second substrate (24).

5. Glazing (10) according to claim 3, wherein the optically clear adhesive (48) and/or the adhesive of the first adhesive layer (42) and/or second adhesive layer is selected (46) from an acrylic adhesive or a silicone adhesive.

6. Glazing (10) according to claim 2, wherein the switchable optical device (26) and/or the further switchable optical device (36) is a liquid crystal device selected from a dye-doped twisted nematic, super twisted nematic, vertically aligned or polymer stabilized cholesteric texture device.

7. Glazing (10) according to claim 1, wherein the layer structure comprises in this order
   the first substrate (12),
   a first electrode layer (14),
   a first alignment layer (16),
   the switchable layer (18),
   a second alignment layer (20),
   a second electrode layer (22) and
   the second substrate (24).

8. Glazing (10) according to claim 1, wherein the layer structure of the glazing (10) is symmetric around the switchable layer.

9. Insulated glazing unit (200) comprising at least one glazing (10) according to claim 1.

10. Method for manufacturing of a glazing (10) according to claim 1, comprising the steps of
    a) providing a switchable optical device (26), at least one further sheet (30) and an adhesive, wherein the switchable optical device (26) has a layer structure comprising in this order
       a first substrate (12),
       a switchable layer (18) and
       a second substrate (24), and
    b) attaching the at least one further sheet (30) to the first substrate (12) by applying the adhesive to the first substrate (12) and/or the at least one further sheet (30) and pressing the at least one further sheet (30) against the first substrate (12) and/or
    attaching the at least one further sheet (30) to the second substrate (24) by applying the adhesive to the second substrate (24) and/or the at least one further sheet (30) and pressing the at least one further sheet (30) against the second substrate (24).

11. Method according to claim 10, wherein the adhesive is provided in the form of a liquid optically clear adhesive, in the form of a double coated adhesive tape or in the form of an adhesive film.

12. Method according to claim 10, wherein the adhesive is provided in the form of a liquid adhesive which is cured during and/or after pressing.

13. Method according to claim 10, wherein pressing is performed by means of a roller.

14. Insulated glazing unit (200) comprising at least one laminated structure (100) according to claim 1.

* * * * *